UNITED STATES PATENT OFFICE.

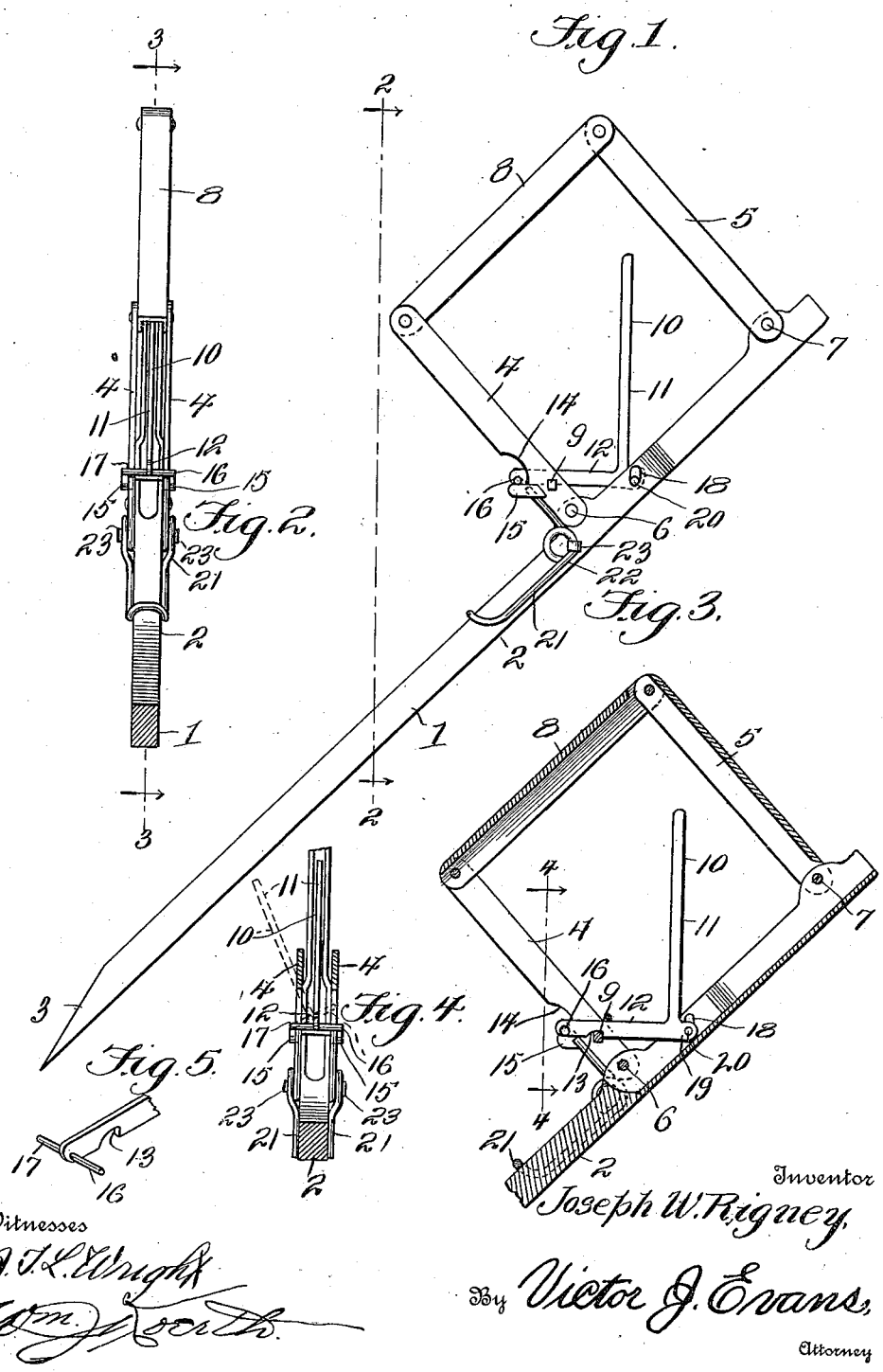

JOSEPH WHEELER RIGNEY, OF MESILLA PARK, TERRITORY OF NEW MEXICO.

GOPHER-TRAP.

989,423. Specification of Letters Patent. Patented Apr. 11, 1911.

Application filed October 5, 1910. Serial No. 585,492.

*To all whom it may concern:*

Be it known that I, JOSEPH W. RIGNEY, a citizen of the United States, residing at Mesilla Park, in the county of Dona Ana and Territory of New Mexico, have invented new and useful Improvements in Gopher-Traps, of which the following is a specification.

This invention relates to improvements in traps, and is especially designed as a gopher trap, but may, of course, be employed for catching various other kinds of animals.

The object of the invention is to provide a device of this character which is simple in construction, which can be easily manufactured and which will perform the functions for which it is devised with ease and with certainty.

With the above, and other objects in view, which will appear as the description progresses, the invention resides in the novel construction and combination of parts hereinafter fully described and claimed.

In the accompanying drawings, Figure 1 is a top plan view of a trap constructed in accordance with the present invention. Fig. 2 is a sectional view upon the line 2—2 of Fig. 1 and looking in the direction of the arrows. Fig. 3 is a horizontal sectional view upon the line 3—3 of Fig. 2. Fig. 4 is a detail sectional view upon the line 4—4 of Fig. 3 and looking in the direction of the arrows. Fig. 5 is a detail perspective view of one end of the trigger.

In the drawings the numeral 1 designates the improved trap. This trap 1 comprises an elongated bar or rod 2, which has its ends sharpened as at 3 whereby the same may be readily inserted within the ground adjacent a gopher hole. The bar or rod 2 adjacent its end opposite to that provided with the entering point is bifurcated or U-shaped for a suitable distance. Pivotally connected between the arms formed by the said bifurcation as at 6 and 7 respectively, is a pair of spaced arms 4 and 5. The bars 4 and 5 are adapted to normally lie at a right angle to the rod 2 and the said bars have their outer ends pivotally connected with a bar 8 which is adapted to lie in a parallel plane to the rod 2. The bars 5 and 8 and the outer portion of the rod or bar 2 are formed of U-shaped members, while the bar 4 comprises a pair of spaced members, as clearly illustrated in Fig. 2 of the drawings. Connecting the spaced members comprising the bar 4 is a pintle 9, while loosely connected with the rod 2 is a trigger member 10. This member 10 is substantially L-shaped and has one of its arms 11 projecting within the space provided by the members 4, 5 and 8, while its opposite and shorter arm 12 is provided with a depression or cut-away portion 13 which is adapted to engage the pintle 9 to sustain the members of the trap in their set-up or right angular position. The pintle 9 is of an angular cross sectional formation and is positioned between the members 4 a suitable distance away from the pivot 6 connecting the said bars 4 with the bar 2. The members 4 have their outer faces provided with an arcuate depression 14 and the said members are further provided with outwardly extending stop or shoulder portions 15. The extremity of the shorter arm 12 of the trigger is formed with oppositely disposed fingers 16 and 17, the same being adapted to normally engage the stops 15 and to be positioned within the arcuate cut-away portions 14 of the members 4. The bifurcated or U-shaped portion of the rod or bar 2 is formed with elongated openings 18, while the member 12 of the L-shaped arm comprising the trigger is formed with an extension 19 which projects slightly beyond the member 11 of the said trigger. This extension or ear 19 is provided with an opening, and positioned within these openings is a pintle 20, the same engaging within the elongated openings 18.

The numeral 21 designates the spring for closing the arms or jaws of the device when the trigger has been operated. This spring 21 comprises a pair of eyes or loops 22 which are positioned upon each side of the bar, and which are connected thereto through the medium of suitable eyes 23. The end convolutions of the loops 22 are extended in opposite directions, one contacting the rod 2 and the other contacting the bar 4.

The trigger 10 is positioned directly above the mouth or opening through which the gopher passes. The rods or jaws are each arranged at substantially right angles so as to form a square, and it will be apparent that should the animal contact the arm 10 of the trigger in either direction the movement of the same will cause the depressed or cut-away portion 13 of the arm 12 to become disengaged from the pintle 9, thus allowing the jaws to collapse and secure the gopher therebetween. Should the gopher contact the under face of the arm 11 the finger 16 engaging the offset 15 of the jaw 4 acts as a fulcrum whereon the trigger is swung and the depression 13 is swung out of engagement with the pintle 9. Should the trap be positioned in an opposite direction the finger 17 contacting the opposite offset 15 will serve in a similar manner.

By the arrangement above described, it will be noted that the bars forming the jaws of the trap will close through the medium of the spring when the arm 11 of the trigger 10 is contacted in any direction, either an upward or downward movement causing the pintle 20 to swing within the slot 18, the fingers 16 acting as a fulcrum to disengage the arm 12 from the pintle 9. The same is true should the said arm 11 be contacted from its rear or that portion adjacent the U-shaped or bifurcated extension of the bar 2 and the member 5. Should the arm 11 be contacted from its opposite side or that portion adjacent the members 4 and 8, the pintle 18 acts as the fulcrum and the fingers 16 and 17 are swung within the depressions 14 of the member 4 when the arm 12 is brought out of engagement with the pintle 9.

From the above description, taken in connection with the accompanying drawings, it will be noted that I have provided an extremely simple and effective device for the purpose intended, and while I have illustrated and described the preferred embodiment of the improvement, as it now appears to me, minor details of construction, within the scope of the following claims may be resorted to if desired.

Having thus described the invention what I claim as new, is:—

1. In a trap of the class described, a bar, a pair of spaced jaw members pivotally connected with the bar, a third jaw member pivotally connected with the first named jaw members and normally sustained at right angles thereto, a spring connected with the bar and adapted to swing the jaw members to a closed position, and a trigger for sustaining the jaws in an open or right angular position.

2. In a device of the class described, right angularly arranged pivot jaws forming a square, a trigger for sustaining the jaws in a right angular position, and a spring exerting pressure upon one of the jaws to hold the same in a closed position after the trigger has been contacted.

3. In a device for the purpose set forth, a bar having one of its ends sharpened, said bar being provided adjacent its opposite end with a pair of spaced pivot jaws, the said jaws having their extremities pivotally connected with a third jaw, a spring upon the bar contacting one of the jaws and adapted to swing all of the said jaws closed, a pintle upon the jaw, an L-shaped trigger pivotally connected to the bar and having one of its arms engaging the pintle to sustain the jaws in an open right angular position, and the opposite arm of the trigger being elongated and extending in the space provided within the right angularly arranged jaws.

4. In a trap, an elongated bar having one of its ends sharpened, the said bar being provided adjacent its opposite end with a pair of spaced pivot jaws, one of said jaws being of a U-shaped cross sectional formation, the second jaw comprising a pair of spaced members, a pintle for these spaced members, a third U-shaped jaw pivotally connected with the extremities of the first-named jaws, an L-shaped trigger pivotally connected with the bar, said trigger having one of its arms provided with a depression adapted to engage with the pintle, the second arm of the jaw adapted to project within the space provided by the right angularly arranged jaws and rod, and a spring member comprising a pair of spaced loops connected to each side of the rod and having one of its ends contacting the inner jaw and its opposite end connected with the bar.

5. In a trap of the class described, a bar, a pair of spaced jaw members pivotally connected with the bar, a third jaw member pivotally connected with the first named jaw members, a loosely mounted L-shaped trigger loosely connected with the bar, one of the jaws comprising a pair of members, a pintle between said members, one of the arms of the L-shaped trigger being provided with a depression engaging the pintle, the said jaw having a pair of offset stops, the extremity of the arm of the trigger being provided with oppositely disposed fingers engaging the stops, and a spring member adapted to collapse the jaws after the trigger has been operated.

In testimony whereof I affix my signature in presence of two witnesses.

JOSEPH WHEELER RIGNEY.

Witnesses:
 JOHN A. ANDERSON,
 WALTER JOHNSON.